US012562599B2

(12) United States Patent
Nishimura

(10) Patent No.: US 12,562,599 B2
(45) Date of Patent: Feb. 24, 2026

(54) CONTACTLESS POWER FEEDER

(71) Applicant: Daifuku Co., Ltd., Osaka (JP)

(72) Inventor: Keiji Nishimura, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 79 days.

(21) Appl. No.: 18/393,981

(22) Filed: Dec. 22, 2023

(65) Prior Publication Data

US 2024/0213811 A1 Jun. 27, 2024

(30) Foreign Application Priority Data

Dec. 26, 2022 (JP) ................................ 2022-208056

(51) Int. Cl.
*H02J 50/40* (2016.01)
*G06F 1/3293* (2019.01)
*H02J 50/10* (2016.01)

(52) U.S. Cl.
CPC ............ *H02J 50/40* (2016.02); *G06F 1/3293* (2013.01); *H02J 50/10* (2016.02)

(58) Field of Classification Search
CPC .......... H02J 50/40; H02J 50/10; H02J 50/005; H02J 50/80; G06F 1/3293; B60M 3/00; B60M 7/00; B60L 5/005; H01L 21/67733
See application file for complete search history.

(56) References Cited

U.S. PATENT DOCUMENTS 4,779,087 A * 10/1988 Fukuda ................. H04L 12/422 370/223
4,779,261 A * 10/1988 Yamagishi ............ H04L 12/437 370/222
10,331,606 B2 * 6/2019 Lection ................ H01R 13/665
10,672,551 B2 * 6/2020 Oki ......................... H01F 27/28
2003/0013477 A1 * 1/2003 McAlinden ......... H04W 52/028 455/8
2004/0030413 A1 * 2/2004 King ...................... G06F 1/206 700/1
2009/0039933 A1 * 2/2009 Wolf ....................... H02J 50/40 307/17
2017/0163088 A1 * 6/2017 Toyoda ..................... H02J 9/02
2021/0044215 A1 * 2/2021 Tsuruta ................. H02M 7/483
2023/0146550 A1 * 5/2023 Nunoya .................. H02J 50/90 307/104
2023/0388821 A1 * 11/2023 Ihira ..................... H04W 24/04
2023/0411193 A1 * 12/2023 Huang .............. H01L 21/67724
2023/0412002 A1 * 12/2023 Tanaka .................... H02J 50/10
2024/0222969 A1 * 7/2024 Matsumoto ............... H02J 3/38
2024/0361783 A1 * 10/2024 Ogawa ................... G05D 1/226

FOREIGN PATENT DOCUMENTS

JP 200267747 A 3/2002

* cited by examiner

*Primary Examiner* — Faisal M Zaman
(74) *Attorney, Agent, or Firm* — The Webb Law Firm

(57) ABSTRACT

Multiple secondary units include a target unit including a switcher that switches between a first mode in which a synchronization signal input into an input unit is transmitted to a processor and output from the processor to an output unit and a second mode in which the synchronization signal input into the input unit is transmitted to the output unit without being through the processor. The switcher switches to the first mode when the processor is in operation and to the second mode when the processor is stopped.

6 Claims, 6 Drawing Sheets

6
7
Primary unit
Secondary unit
Power supply
8
5

Fig. 5

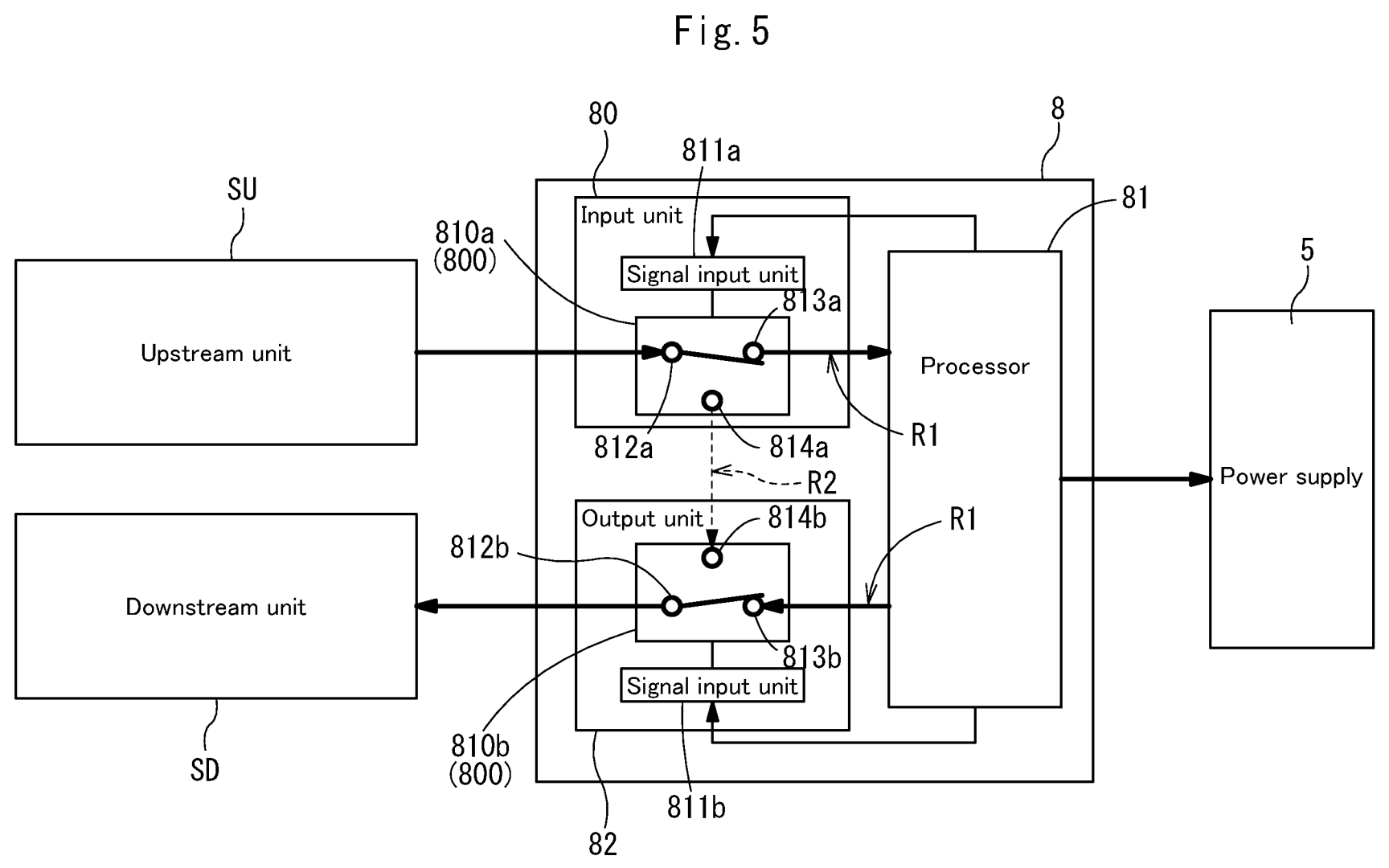

5
Power supply
8
81
Processor
R1
R1
80
Input unit
Signal input unit
811a
810a (800)
812a
813a
814a
R2
814b
813b
82
Output unit
Signal input unit
811b
812b
810b (800)
SU
Upstream unit
SD
Downstream unit

Fig. 6

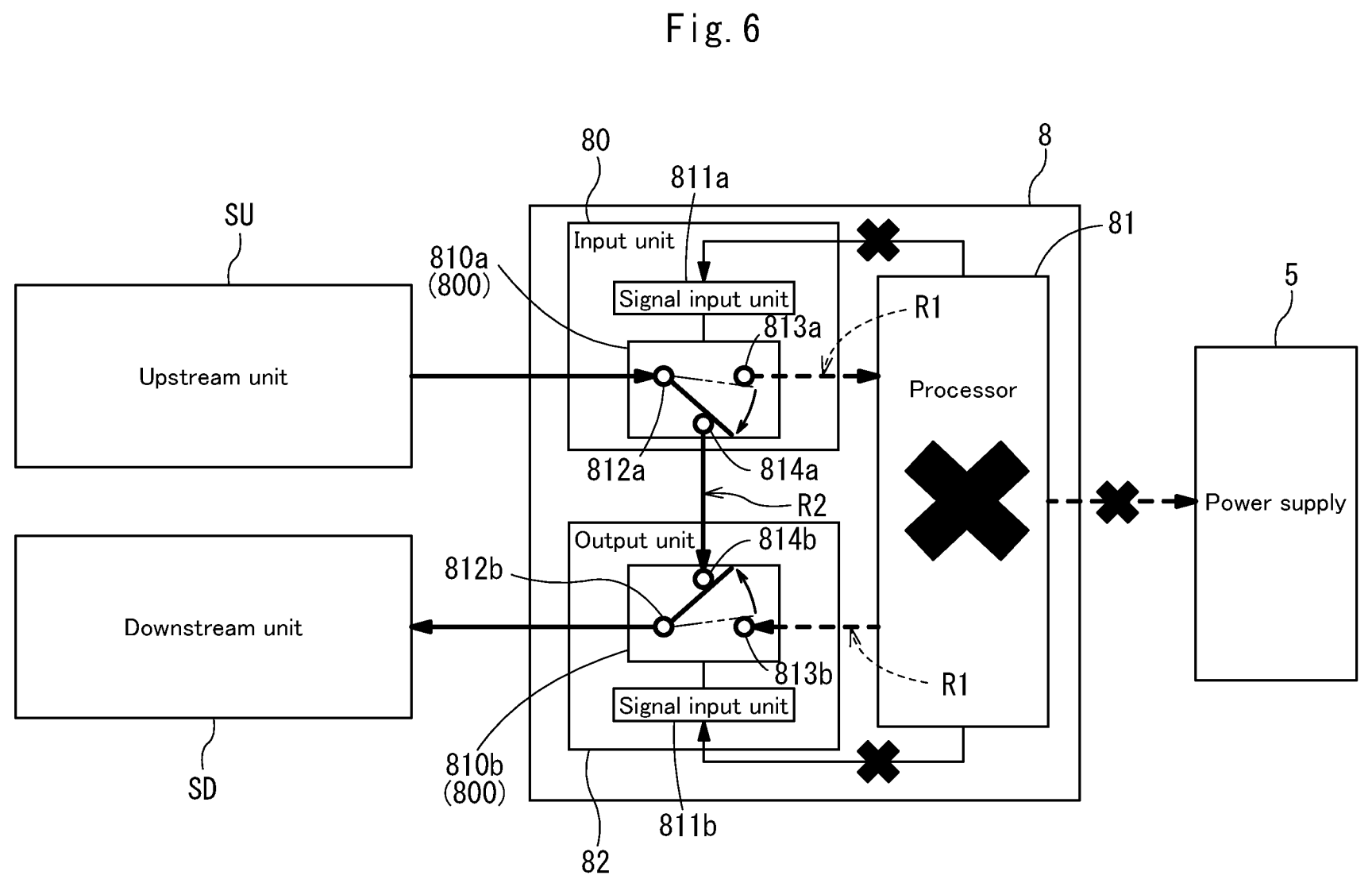

Power supply
5
8
81
Processor
R1
R1
80
Input unit
Signal input unit
811a
813a
814a
R2
812a
810a (800)
82
Output unit
Signal input unit
811b
813b
814b
812b
810b (800)
SU
Upstream unit
SD
Downstream unit

CONTACTLESS POWER FEEDER

CROSS-REFERENCE TO RELATED APPLICATION

This application claims priority to Japanese Patent Application No. 2022-208056 filed Dec. 26, 2022, the disclosure of which is hereby incorporated by reference in its entirety.

BACKGROUND OF THE INVENTION

Field of the Invention

The present invention relates to a contactless power feeder.

Description of Related Art

An example contactless power feeder is described in Japanese Unexamined Patent Application Publication No. 2002-67747. In the background described hereafter, reference signs in parentheses are the reference signs in the above literature.

In this contactless power feeder, a primary unit (51A) transmits a synchronization signal to multiple secondary units (51), and power supplies (M) connected to the respective secondary units (51) supply alternating currents to the corresponding feed lines (47) based on synchronization signals received from the respective secondary units (51). This synchronizes the phases of the alternating currents supplied to the feed lines (47).

When such a contactless power feeder includes secondary units connected in series, the primary unit (51A) located most upstream transmits a synchronization signal sequentially from an upstream secondary unit to a downstream secondary unit along a transmission path for the synchronization signal. Once one secondary unit in the transmission path for the synchronization signal fails, the secondary units downstream from the failed secondary unit can receive no synchronization signal. Thus, all the power supplies connected to the failed secondary unit and the secondary units downstream from the failed secondary unit can be asynchronous with one another. This may degrade the power feeding capability of the power feeder.

SUMMARY OF THE INVENTION

One or more aspects are directed to a contactless power feeder that can avoid, when one of secondary units connected in series fails, the state in which all power supplies connected to the failed secondary unit and the secondary units downstream from the failed secondary unit are asynchronous with one another.

In response to the above, a contactless power feeder is a power feeder for supplying power contactlessly to a power receiver. The contactless power feeder includes a plurality of feed lines arranged along a movement path for a movable body including the power receiver, a plurality of power supplies connected to the respective plurality of feed lines to supply alternating currents to the plurality of feed lines, and a synchronization system that synchronizes phases of the alternating currents in the plurality of power supplies. The synchronization system includes a primary unit that generates and outputs a synchronization signal, and a plurality of secondary units located downstream from the primary unit in a transmission path for the synchronization signal to receive the synchronization signal from the primary unit. Each of the plurality of secondary units is connected directly to the primary unit or indirectly to the primary unit through a secondary unit of the plurality of secondary units. Each of the plurality of power supplies is connected to a connected unit being the primary unit or one of the plurality of secondary units and receives the synchronization signal from the connected unit. Each of the plurality of secondary units includes an input unit that receives an input of the synchronization signal from an upstream unit, a processor that processes the synchronization signal input into the input unit, and an output unit that outputs the synchronization signal to a downstream unit. The upstream unit is the primary unit or a secondary unit of the plurality of secondary units connected directly to and upstream from a reference secondary unit in the transmission path. The downstream unit is a secondary unit of the plurality of secondary units connected directly to and downstream from the reference secondary unit in the transmission path. The reference secondary unit is one of the plurality secondary units. The plurality of secondary units include a target unit including a switcher that switches between a first mode in which the synchronization signal input into the input unit is transmitted to the processor and output from the processor to the output unit and a second mode in which the synchronization signal input into the input unit is transmitted to the output unit without being through the processor. The switcher switches to the first mode when the processor is in operation and to the second mode when the processor is stopped.

In this structure, when one of the secondary units connected in series fails, the synchronization signal can be transmitted to the downstream secondary unit without being through the failed secondary unit. Thus, when one of the secondary units fails, the power supplies other than the power supply connected to the failed secondary unit can remain synchronized by the synchronization signal. In other words, when one of the secondary units fails, the structure can avoid the state in which all the power supplies connected to the failed secondary unit and the secondary units downstream from the failed secondary unit are asynchronous with one another.

BRIEF DESCRIPTION OF THE DRAWINGS

FIG. 5 is a schematic diagram of a secondary unit in a first mode in which a synchronization signal output from a processor is transmitted to an output unit.

FIG. 6 is a schematic diagram of a secondary unit in a second mode in which a synchronization signal input into an input unit is transmitted to the output unit without being through the processor.

DESCRIPTION OF THE INVENTION

A contactless power feeder 100 according to an embodiment is described below with reference to the drawings. In the present embodiment, the contactless power feeder 100 is installed in an article transport facility 200.

Figure 1:
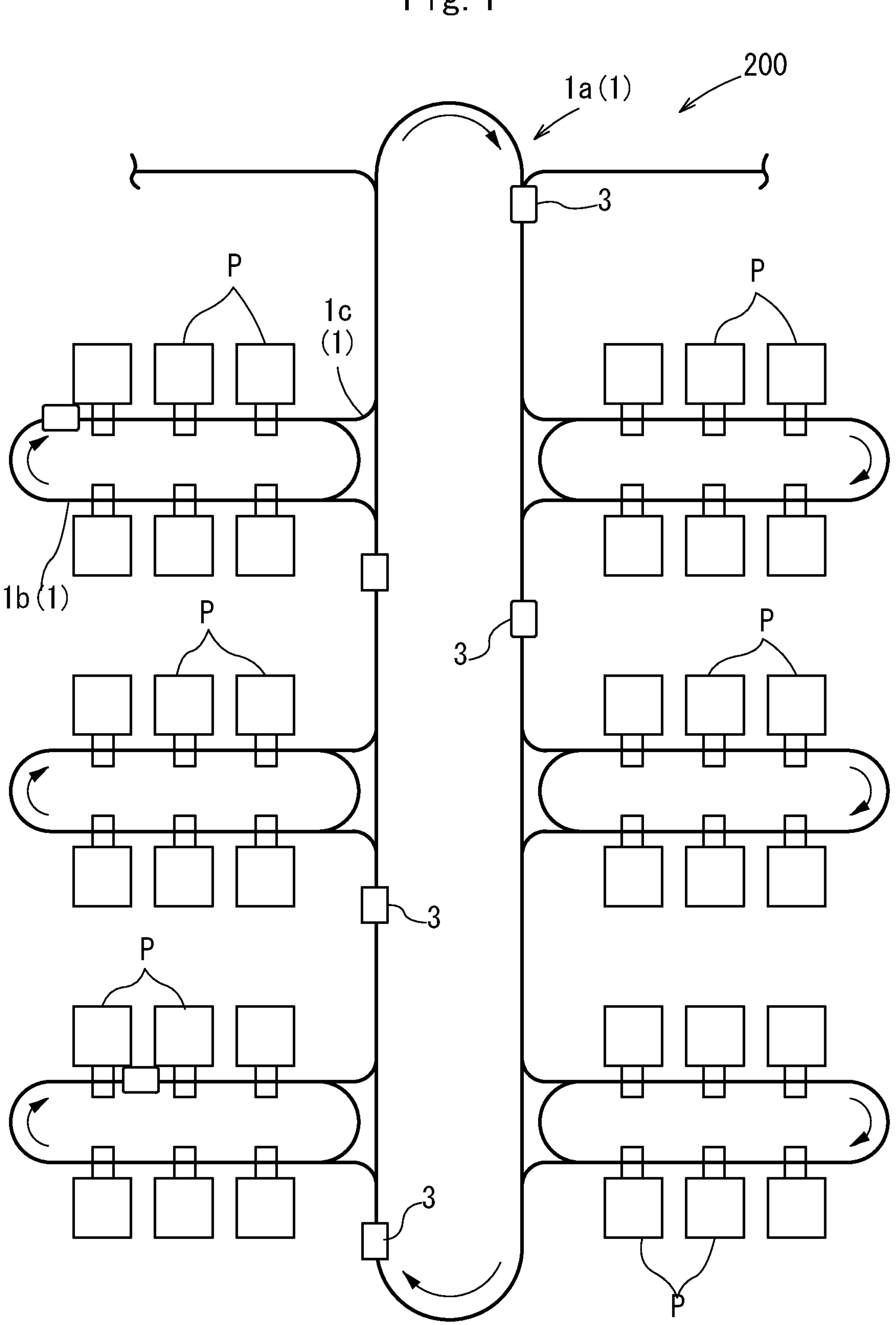
FIG. 1 is a plan view of an article transport facility including a contactless power feeder according to an embodiment.
Figure 2:
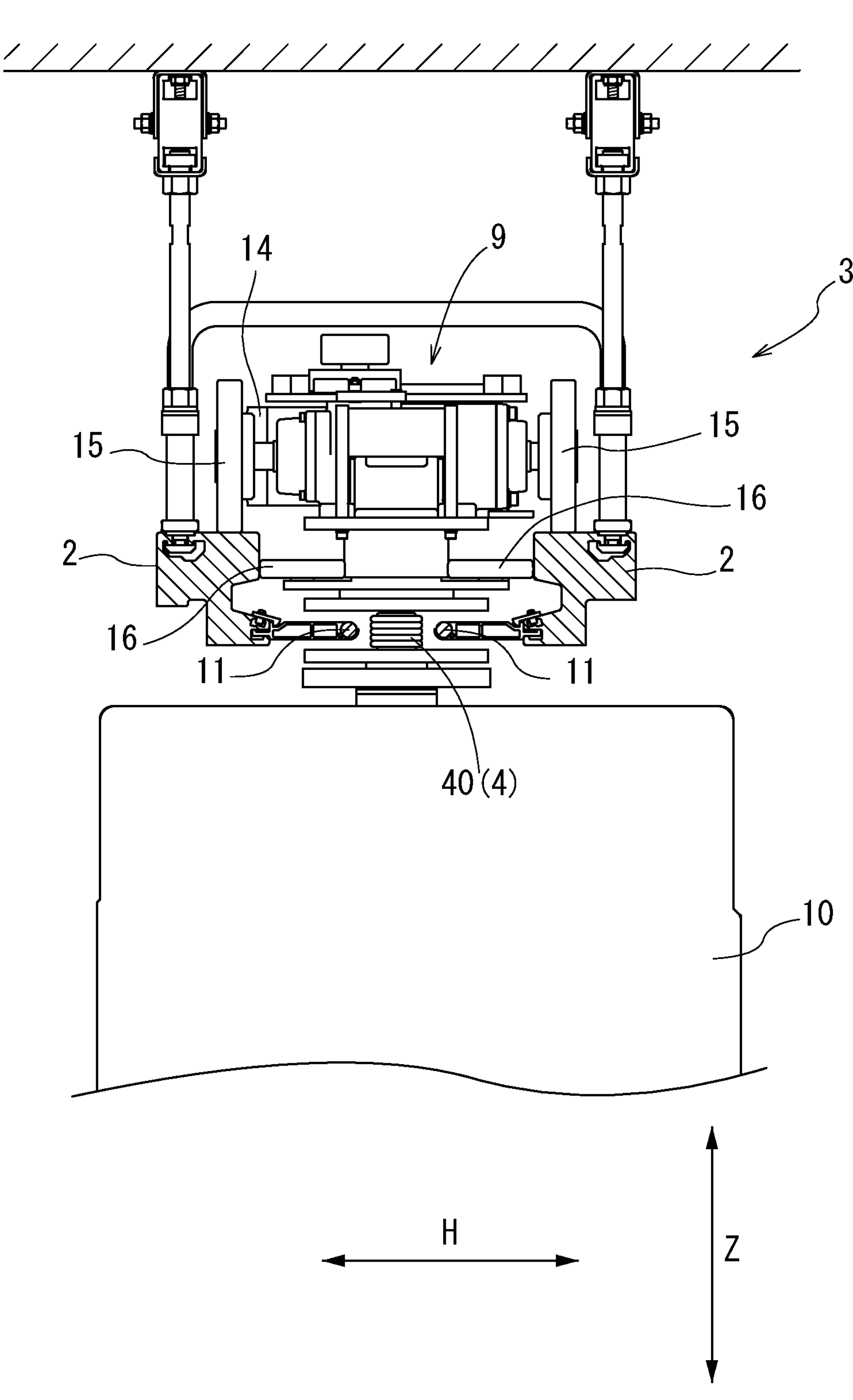
FIG. 2 is a front view of an article transport vehicle included in the article transport facility.

As shown in FIGS. 1 and 2, the article transport facility 200 includes travel rails 2 and movable bodies 3. The travel rails 2 are installed along a movement path 1 for the movable bodies 3. In the present embodiment, a pair of travel rails 2 are hung from a ceiling at a predetermined distance in a path width direction H orthogonal to the movement path 1, as viewed vertically, or more specifically, in an up-down direction Z parallel to the vertical direction (refer to FIG. 2). In the present embodiment, the movable bodies 3 are article transport vehicles that travel along the movement path 1 as being guided along the travel rails 2. The movable bodies 3 as the article transport vehicles transport, for example, front opening unified pods (FOUPs) holding semiconductor substrates or glass substrates to be used as materials for displays.

As shown in FIG. 1, the movement path 1 in the present embodiment includes a single looped-primary path 1*a*, multiple looped secondary paths 1*b* each extending through multiple article processors P, and multiple connecting paths 1*c* connecting the primary path 1*a* and the secondary paths 1*b*.

As shown in FIG. 2, each movable body 3 includes a power receiver 4 that contactlessly receives driving power from a feed line 11 extending along the movement path 1. In the present embodiment, the movable body 3 further includes a traveler 9 that travels along the movement path 1 as being guided along the pair of travel rails 2 and a transport vehicle body 10 located below the travel rails 2 and hung from the traveler 9.

The traveler 9 includes a drive motor 14 and a pair of drive wheels 15. The drive motor 14 is a drive power source for the pair of drive wheels 15. The pair of drive wheels 15 are rotatably drivable by the drive motor 14. The drive wheels 15 roll on the upper surfaces of the travel rails 2 that serve as travel surfaces. In the present embodiment, the traveler 9 further includes a pair of guide wheels 16. The pair of guide wheels 16 are supported in a manner rotatable about an axis extending in the up-down direction Z. The pair of guide wheels 16 are in contact with a pair of inner side surfaces of the pair of travel rails 2 facing in the path width direction H.

The transport vehicle body 10 includes an article support that is vertically movable with respect to the traveler 9 and supports an article being hung and an actuator that raises and lowers the article support (not shown).

Power for driving loads such as the drive motor 14 described above and various actuators (driving power for the movable body 3) is fed contactlessly from the feed line 11 to the power receiver 4 and then supplied to each load from the power receiver 4. As described above, the feed line 11, which supplies driving power for the movable body 3 to the power receiver 4, extends along the movement path 1. In the present embodiment, the feed line 11 extends on both sides of the power receiver 4 in the path width direction H.

In the present embodiment, the power receiver 4 includes a pickup coil 40. In the pickup coil 40, a magnetic field generated around the feed line 11 receiving an alternating current induces alternating current power. The alternating current power is converted to direct current power by a power receiver circuit including, for example, a rectifier and a smoothing capacitor and is supplied to the drive motor 14 and various actuators.

Figure 3:
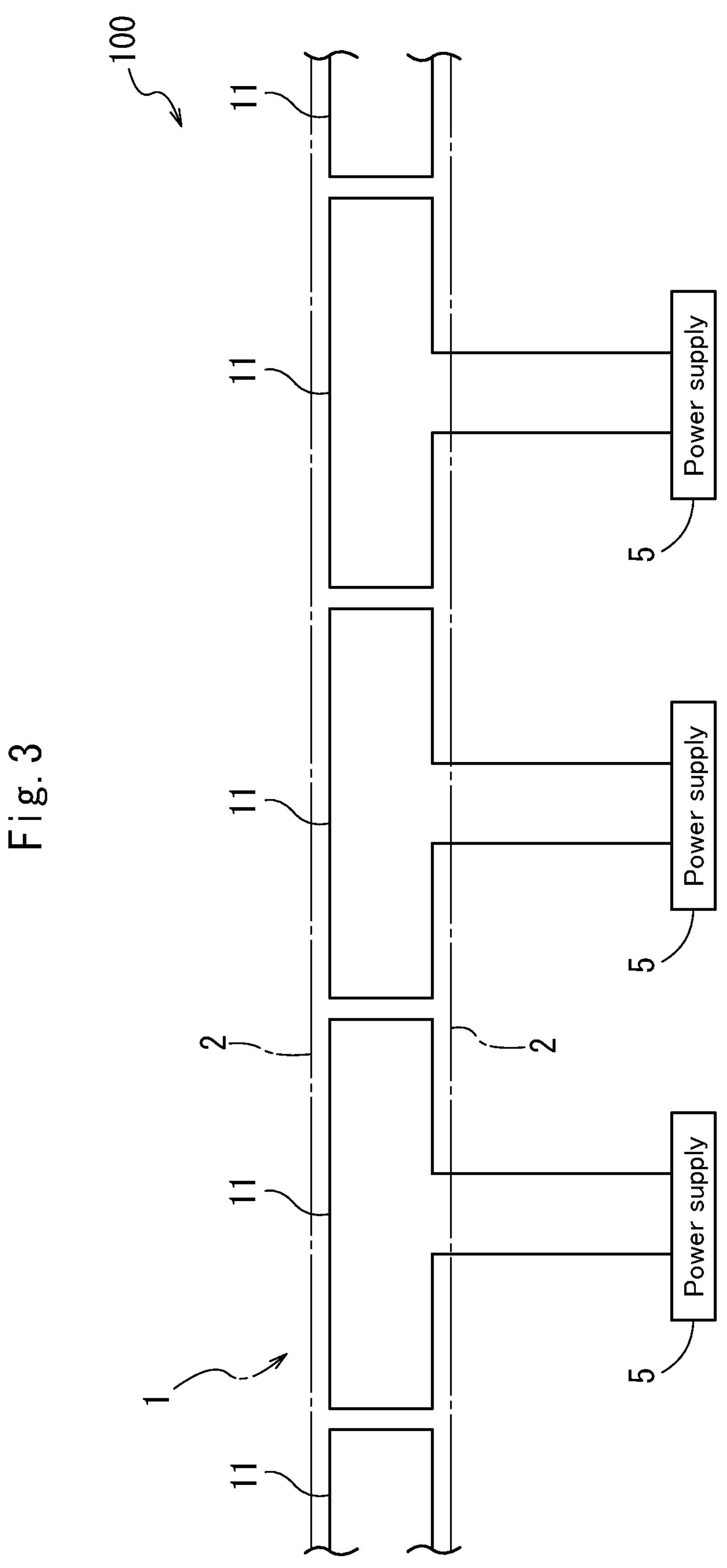
FIG. 3 is a schematic diagram of the contactless power feeder according to the embodiment.

The contactless power feeder 100 contactlessly supplies power to the power receiver 4. As shown in FIG. 3, the contactless power feeder 100 includes multiple feed lines 11 arranged along the movement path 1 for the movable bodies 3 each including the power receiver 4 and power supplies 5 connected to the respective feed lines 11 to supply alternating currents to the feed lines 11. The contactless power feeder 100 thus includes multiple sets of feed lines 11 and power supplies 5. This structure can reduce, for example, a decrease in the power transmission efficiency with the feed lines 11 or stoppage of the entire facility upon failure in the relatively large article transport facility 200 (refer to FIG. 1) including the single large looped-primary path 1*a* and the multiple secondary paths 1*b* looped smaller than the primary path 1*a*.

Although not shown, each power supply 5 includes a power supply circuit that supplies an alternating current to the feed line 11 connected to the power supply 5 and a power supply controller that controls the power supply circuit. The power supply circuit mainly includes a switching power supply circuit including, for example, an inverter circuit. The power supply controller controls the duty cycle of a switching control signal for switching a switching element included in the inverter circuit based on a command value. For example, the power supply controller causes the power supply circuit to output an alternating current through pulse width modulation (PWM). The command value is, for example, a current value that is either an effective value or a peak value (peak-to-peak value) or the duty cycle in PWM control.

Figure 4:
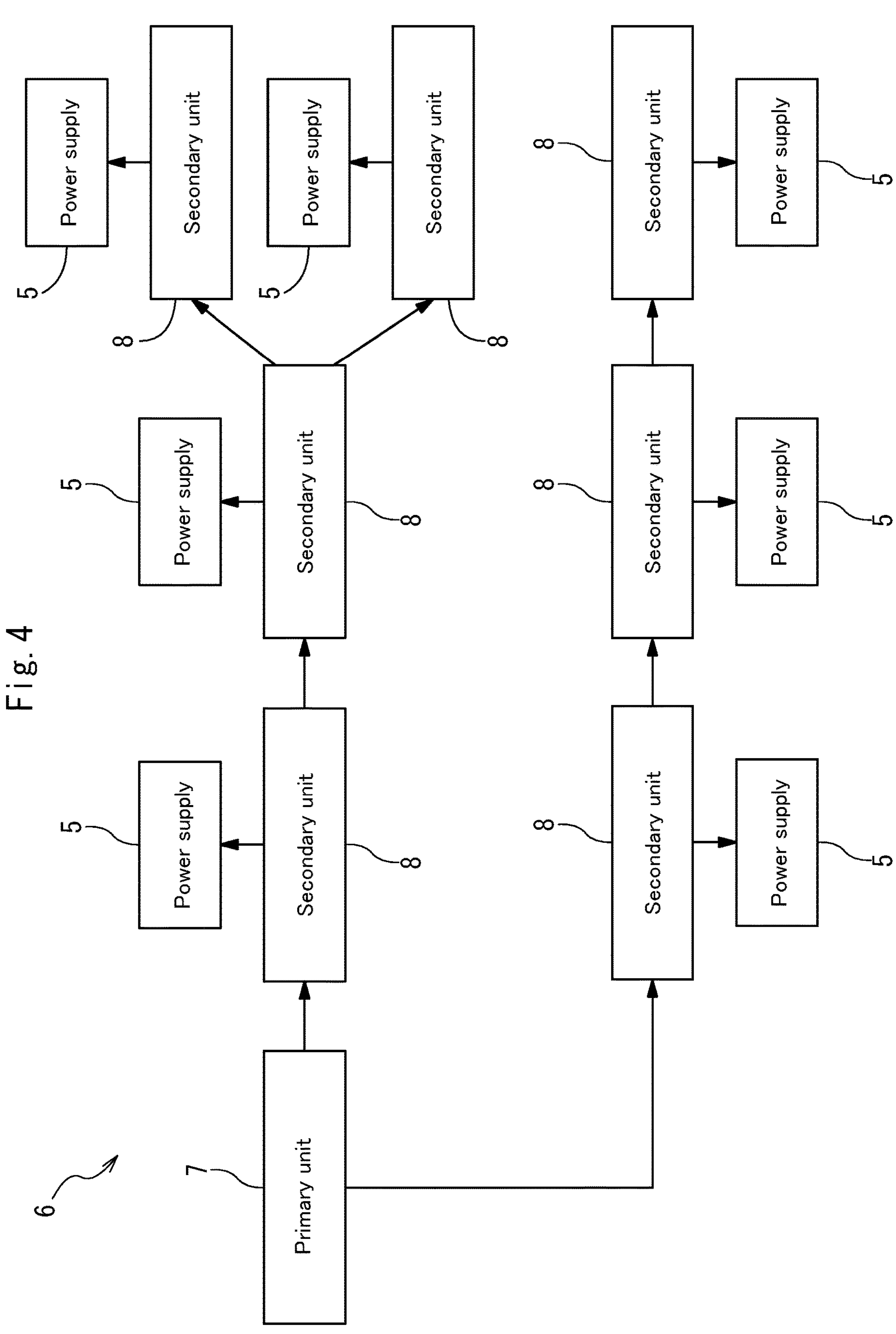
FIG. 4 is a schematic diagram of a synchronization system with an example structure.

As shown in FIG. 4, the contactless power feeder 100 further includes a synchronization system 6 that synchronizes the phases of the alternating currents in the multiple power supplies 5. The synchronization system 6 includes a primary unit 7 that transmits a synchronization signal having a predetermined period and one or more secondary units 8 connected downstream from the primary unit 7 in a transmission path for the synchronization signal to receive the synchronization signal from the primary unit 7.

The primary unit 7 generates and outputs a synchronization signal. Each secondary unit 8 is directly connected to the primary unit 7 or indirectly connected to the primary unit 7 with another secondary unit 8 in between. Each secondary unit 8 is also connected to at least one power supply 5. The power supply 5 connected to each secondary unit 8 receives the synchronization signal from the secondary unit 8 and supplies an alternating current to the corresponding feed line 11 in response to the synchronization signal. Although the primary unit 7 is not connected to a power supply 5 in the example shown in FIG. 4, the primary unit 7 may be connected to a power supply 5. The secondary units 8 connected to the power supplies 5 and the primary unit 7 connected to a power supply 5 are each referred to as a connected unit.

Each power supply 5 connected to a connected unit that is either the primary unit 7 or one of the secondary units 8 receives the synchronization signal from the connected unit.

The transmission path for the synchronization signal extends with the primary unit 7 located most upstream and the secondary units 8 located downstream from the primary unit 7 in series. In the synchronization system 6 including multiple secondary units 8, not all the secondary units 8 may be connected in series in the same transmission path. For example, as shown in FIG. 4, the system may include multiple transmission paths branching from the primary unit 7 and include secondary units 8 connected in series in each transmission path. The system may include transmission paths branching from a predetermined secondary unit 8 and include secondary units 8 connected in series in each transmission path.

In the example described below with reference to FIGS. 5. and 6, an upstream unit SU refers to the primary unit 7 or a secondary unit 8 connected directly to and upstream from a reference secondary unit 8 in the transmission path, and a downstream unit SD refers to a secondary unit 8 connected directly to and downstream from the reference secondary unit 8 in the transmission path. The reference secondary unit 8 is any of the multiple secondary units 8.

Each secondary unit 8 includes an input unit 80 for receiving a synchronization signal from the upstream unit SU, a processor 81 for processing the synchronization signal input into the input unit 80, and an output unit 82 for outputting the synchronization signal to the downstream unit SD. The input unit 80 and the output unit 82 are each connected to the processor 81 with a first path R1.

At least one of the secondary units 8 includes a switcher 800 to switch between a first mode and a second mode. In the first mode, the synchronization signal input into the input unit 80 is transmitted to the processor 81 and then output from the processor 81 to the output unit 82. In the second mode, the synchronization signal input into the input unit 80 is transmitted to the output unit 82 without being through the processor 81. The secondary unit 8 including the switcher 800 is referred to as a target unit. In the present embodiment, each secondary unit 8 includes the switcher 800, or in other words, is the target unit. In some embodiments, at least one of the secondary units 8 may be the target unit, and the synchronization system 6 may include a secondary unit 8 including no switcher 800 but including the input unit 80, the processor 81, and the output unit 82.

The switcher 800 switches to the first mode when the processor 81 is in operation (more specifically, in normal operation) and to the second mode when the processor 81 is stopped. The switcher 800 includes an input switch 810*a* and an output switch 810*b*. The input switch 810*a* connects the input unit 80 selectively to the processor 81 or the output unit 82. The output switch 810*b* connects the output unit 82 selectively to the processor 81 or the input unit 80. In the present embodiment, each of the input switch 810*a* and the output switch 810*b* corresponds to a switch.

The input switch 810*a* includes a signal input unit 811*a* for receiving an operation signal indicating whether the processor 81 is in normal operation, a movable contact 812*a*, a first path fixed contact 813*a*, and a second path fixed contact 814*a*. The output switch 810*b* includes a signal input unit 811*b* for receiving the operation signal indicating whether the processor 81 is in normal operation, a movable contact 812*b*, a first path fixed contact 813*b*, and a second path fixed contact 814*b*.

When the processor 81 is in normal operation based on the operation signal input into the signal input unit 811*a*, the input switch 810*a* connects the movable contact 812*a* and the first path fixed contact 813*a* to connect the input unit 80 and the processor 81, switching to the first mode. When the processor 81 is stopped and no operation signal is input, the input switch 810*a* connects the movable contact 812*a* and the second path fixed contact 814*a* to disconnect the processor 81 and the input unit 80 and connect the input unit 80 and the output unit 82, switching to the second mode. The input switch 810*a* may be any appropriate relay. The input switch 810*a* may connect the movable contact 812*a* and the first path fixed contact 813*a* when, for example, a voltage as the operation signal is input into the signal input unit 811*a* and may automatically switch to a position connecting the movable contact 812*a* and the second path fixed contact 814*a* when no voltage as the operation signal is input.

When the processor 81 is in normal operation based on the operation signal input into the signal input unit 811*b*, the output switch 810*b* connects the movable contact 812*b* and the first path fixed contact 813*b* to connect the output unit 82 and the processor 81, switching to the first mode. When the processor 81 is stopped and no operation signal is input, the output switch 810*b* connects the movable contact 812*b* and the second path fixed contact 814*b* to disconnect the processor 81 and the output unit 82 and connect the input unit 80 and the output unit 82, switching to the second mode. The output switch 810*b* may be any appropriate relay. The output switch 810*b* may connect the movable contact 812*b* and the first path fixed contact 813*b* when, for example, a voltage as the operation signal is input into the signal input unit 811*b* and may automatically switch to a position connecting the movable contact 812*b* and the second path fixed contact 814*b* when no voltage as the operation signal is input.

The primary unit 7 transmits the synchronization signal having the predetermined period to the secondary unit 8 directly connected to the primary unit 7. The secondary unit 8 receiving the synchronization signal transmits the synchronization signal to its downstream secondary unit 8 directly connected to the secondary unit 8 transmitting the synchronization signal. In other words, the secondary units 8 connected in series repeatedly transmit and receive the synchronization signal sequentially from an upstream secondary unit 8 to a downstream secondary unit 8.

As shown in FIG. 5, when the processor 81 in a secondary unit 8 is in normal operation, the processor 81 transmits an operation signal (e.g., a voltage signal of 5 V) to the signal input unit 811*a* in the input switch 810*a* and to the signal input unit 811*b* in the output switch 810*b*.

In the first mode in which the operation signal is input into the signal input unit 811*a* and the signal input unit 811*b*, the switcher 800 connects the movable contact 812*a* and the first path fixed contact 813*a* in the input switch 810*a* to connect the input unit 80 and the processor 81, and connects the movable contact 812*b* and the first path fixed contact 813*b* in the output switch 810*b* to connect the output unit 82 and the processor 81, thus defining the first path R1.

In the first mode, the synchronization signal from the upstream unit SU is transmitted from the input unit 80 to the processor 81 through the first path R1. The processor 81 receiving the synchronization signal performs a delay correction process of correcting a delay in the synchronization signal resulting from the length of the transmission path and a buffering process of amplifying or increasing the strength of the synchronization signal. The synchronization signal resulting from the above processes is transmitted to the corresponding power supply 5 and to the output unit 82 through the first path R1. The output unit 82 receiving the synchronization signal then outputs the synchronization signal to the downstream unit SD.

As shown in FIG. 6, when the processor 81 in a secondary unit 8 fails and is stopped, the processor 81 stops transmitting an operation signal (voltage signal of 0 V). Thus, no operation signal is input into the signal input unit 811*a* in the input switch 810*a* and to the signal input unit 811*b* in the output switch 810*b*. The processor 81 being stopped includes the processor 81 being stopped abnormally due to, for example, failure, the processor 81 outputting no operation signal due to failure in signal lines or other components in the secondary unit 8, and power supply to the secondary unit 8 being stopped due to, for example, an abnormality in the power supply line for the secondary unit 8 or by human operations.

In the second mode in which no operation signal being input into the signal input unit 811*a* and the signal input unit 811*b*, the switcher 800 connects the movable contact 812*a* and the second path fixed contact 814*a* in the input switch

810*a* to disconnect the processor 81 and the input unit 80, and connects the movable contact 812*b* and the second path fixed contact 814*b* in the output switch 810*b* to disconnect the processor 81 and the output unit 82. This directly connects the input unit 80 and the output unit 82, thus defining a second path R2.

In the second mode, the synchronization signal from the upstream unit SU is directly transmitted from the input unit 80 to the output unit 82 through the second path R2. Thus, when one of the secondary units 8 connected in series fails, the synchronization signal can be transmitted to the downstream unit SD without being through the processor 81 in the failed secondary unit 8.

Thus, when one of the secondary units 8 fails, the power supplies 5 other than the power supply 5 connected to the failed secondary unit 8 can remain synchronized by the synchronization signal. In other words, when one of the secondary units 8 fails, the system can avoid the state in which all the power supplies 5 connected to the failed secondary unit 8 and its downstream secondary units 8 are asynchronous with one another.

Other embodiments will now be described. The structure described in each of the above embodiments may be combined with any other structures described in the other embodiments unless any contradiction arises. The embodiments described herein are merely illustrative in all aspects and may be modified variously as appropriate without departing from the spirit and scope of the present disclosure.

(1) In the above embodiments, the processor performs the delay correction process and the buffering process. In some embodiments, the processor is not limited to such a structure, and may perform one of the delay correction process or the buffering process. The synchronization signal resulting from the process being performed may be transmitted to the corresponding power supply and the output unit. For example, the delay is greater when the signal strength is weaker. The buffering process alone may reduce the delay within an appropriate range, depending on the size of the facility or the level of an acceptable delay.

(2) In the above embodiments, each secondary unit is a target unit. In some embodiments, each secondary unit is not a target unit, and the most downstream secondary unit may be a non-target unit including no switcher.

(3) In the above embodiments, the switches are relay circuit switches. In some embodiments, the switches are not relay circuit switches, and may be semiconductor switches including insulated-gate bipolar transistors (IGBTs) and field-effect transistors (FETs). In some embodiments, an integrated circuit (IC) board may be installed in addition to the processor to monitor the processor for switching.

(4) In the above embodiments, the operation signal is input when the processor is in operation. With the operation signal being input, the first mode is used. With no operation signal being input, the second mode is used. In some embodiments, the mode may be switched in a different manner. The structure may include a monitoring processor to monitor the state of the processor and switch the secondary unit between the first mode and the second mode (change the positions of the switches).

(5) In the above embodiments, the operation signal is an on-off signal that is a voltage signal of 5 V in normal operation and a voltage signal of 0 V in stoppage. In some embodiments, the operation signal transmitted may be any other signal such as a voltage signal of 5 V in normal operation and a voltage signal of −5 V in stoppage. In some embodiments, information indicating whether the processor is in normal operation or is stopped may be transmitted. In this case, the switcher is a switching unit (IC chip) that operates on software.

An overview of the contactless power feeder described above will be provided.

A contactless power feeder according to one aspect is a power feeder for supplying power contactlessly to a power receiver. The contactless power feeder includes a plurality of feed lines arranged along a movement path for a movable body including the power receiver, a plurality of power supplies connected to the respective plurality of feed lines to supply alternating currents to the plurality of feed lines, and a synchronization system that synchronizes phases of the alternating currents in the plurality of power supplies. The synchronization system includes a primary unit that generates and outputs a synchronization signal, and a plurality of secondary units located downstream from the primary unit in a transmission path for the synchronization signal to receive the synchronization signal from the primary unit. Each of the plurality of secondary units is connected directly to the primary unit or indirectly to the primary unit through a secondary unit of the plurality of secondary units. Each of the plurality of power supplies is connected to a connected unit being the primary unit or one of the plurality of secondary units and receives the synchronization signal from the connected unit. Each of the plurality of secondary units includes an input unit that receives an input of the synchronization signal from an upstream unit, a processor that processes the synchronization signal input into the input unit, and an output unit that outputs the synchronization signal to a downstream unit. The upstream unit is the primary unit or a secondary unit of the plurality of secondary units connected directly to and upstream from a reference secondary unit in the transmission path. The downstream unit is a secondary unit of the plurality of secondary units connected directly to and downstream from the reference secondary unit in the transmission path. The reference secondary unit is one of the plurality secondary units. The plurality of secondary units include a target unit including a switcher that switches between a first mode in which the synchronization signal input into the input unit is transmitted to the processor and output from the processor to the output unit and a second mode in which the synchronization signal input into the input unit is transmitted to the output unit without being through the processor. The switcher switches to the first mode when the processor is in operation and to the second mode when the processor is stopped.

In this structure, when one of the secondary units connected in series fails, the synchronization signal can be transmitted to the downstream secondary unit without being through the failed secondary unit. Thus, when one of the secondary units fails, the power supplies other than the power supply connected to the failed secondary unit can remain synchronized by the synchronization signal. In other words, when one of the secondary units fails, the structure can avoid the state in which all the power supplies connected to the failed secondary unit and the secondary units downstream from the failed secondary unit are asynchronous with one another.

The switcher may include a switch to connect the input unit selectively to the processor or the output unit. The switch may include a signal input unit that receives an operation signal indicating whether the processor is in normal operation. The switch may connect the input unit and the processor to switch to the first mode when the processor is in normal operation based on the operation signal input into the signal input unit and connect the input unit and the output unit to switch to the second mode when the processor is stopped.

This structure can promptly connect the input unit and the output unit upon stoppage of the processor to switch the secondary unit to the second mode.

The switch may further connect the processor and the output unit when the processor is in normal operation and disconnect the processor and the output unit when the processor is stopped.

This structure can disconnect the processor and the output unit upon stoppage of the processor. Thus, when the processor fails and causes a ground fault, the synchronization signal from the input unit can be transmitted to the output unit.

Each of the plurality of secondary units may be the target unit.

In this structure, each secondary unit can have the same structure. All the secondary units can thus be used in the same manner without distinguishing the secondary units each including the switcher and the secondary units each including no switcher. This decreases the variety of products and reduces errors in wiring.

The processor may perform at least one of a delay correction process of correcting a delay in the synchronization signal resulting from a length of the transmission path or a buffering process of increasing strength of the synchronization signal, and transmit the synchronization signal resulting from the process being performed to a corresponding power supply of the plurality of power supplies and the output unit.

With the processor performing the delay correction process, this structure allows the synchronization signal to be transmitted to the corresponding power supply after the delay in the synchronization signal resulting from the length of the transmission path is corrected. With the processor performing the buffering process, the structure can maintain the appropriate signal strength on any long transmission path for the synchronization signal. Thus, all the power supplies can be appropriately synchronized with one another on any long transmission path for the synchronization signal from the primary unit to the most downstream secondary unit.

The invention claimed is:

1. A contactless power feeder for supplying power contactlessly to a power receiver, the contactless power feeder comprising:
- a plurality of feed lines arranged along a movement path for a movable body including the power receiver;
- a plurality of power supplies connected to the respective plurality of feed lines to supply alternating currents to the plurality of feed lines; and
- a synchronization system configured to synchronize phases of the alternating currents in the plurality of power supplies, wherein the synchronization system comprises:
- a primary unit configured to generate and output a synchronization signal; and
- a plurality of secondary units located downstream from the primary unit in a transmission path for the synchronization signal to receive the synchronization signal from the primary unit, each of the plurality of secondary units connected directly to the primary unit or indirectly to the primary unit through a secondary unit of the plurality of secondary units, and wherein:
- each of the plurality of power supplies is connected to a connected unit being the primary unit or one of the plurality of secondary units and receives the synchronization signal from the connected unit,
- each of the plurality of secondary units comprises an input unit configured to receive an input of the synchronization signal from an upstream unit, a processor configured to process the synchronization signal input into the input unit, and an output unit configured to output the synchronization signal to a downstream unit, where the upstream unit is the primary unit or a secondary unit of the plurality of secondary units connected directly to and upstream from a reference secondary unit in the transmission path, and the downstream unit is a secondary unit of the plurality of secondary units connected directly to and downstream from the reference secondary unit in the transmission path, where the reference secondary unit is one of the plurality secondary units,
- the plurality of secondary units comprise a target unit comprising a switcher configured to switch between a first mode in which the synchronization signal input into the input unit is transmitted to the processor and output from the processor to the output unit and a second mode in which the synchronization signal input into the input unit is transmitted to the output unit without being through the processor, and
- the switcher switches to the first mode when the processor is in operation and to the second mode when the processor is stopped, wherein the switcher comprises:
- an input switch connects the input unit selectively to the processor or the output unit; and
- an output switch connects the output unit selectively to the processor or the input unit, and wherein:
- in the first mode the input switch to connect the input unit and the processor, and the output switch to connect the processor and the output unit, while the input switch and the output switch disconnects the input unit and the output unit, and
- in the second mode the input switch to disconnect the input unit and the processor, and the output switch to disconnect the processor and the output unit, while the input switch and the output switch connect the input unit and the output unit.

2. The contactless power feeder according to claim 1, wherein:
- each of the input switch and the output switch comprises a signal input unit configured to receive an operation signal indicating whether the processor is in normal operation, and
- the switch connects the input unit and the processor to switch to the first mode when the processor is in normal operation based on the operation signal input into the signal input unit and connects the input unit and the output unit to switch to the second mode when the processor is stopped.

3. The contactless power feeder according to claim 2, wherein:
- the output switch connects the processor and the output unit when the processor is in normal operation and disconnects the processor and the output unit when the processor is stopped.

4. The contactless power feeder according to claim 1, wherein:

each of the plurality of secondary units is the target unit.

5. The contactless power feeder according to claim 1, wherein:

the processor performs at least one of a delay correction process of correcting a delay in the synchronization signal resulting from a length of the transmission path or a buffering process of increasing strength of the synchronization signal, and transmits the synchronization signal resulting from the process being performed to a corresponding power supply of the plurality of power supplies and the output unit.

6. The contactless power feeder according to claim 1, wherein:

each of the input switch and the output switch comprises a signal input unit configured to receive an operation signal indicating whether the processor is in normal operation, wherein the signal input unit receives a voltage from the processor as the operation signal when the processor is in normal operation and receives no voltage input when the processor is stopped, wherein the input switch and the output switch switches from the first mode to the second mode in response to the signal input unit receives no voltage input from the processor.

* * * * *